United States Patent
Gagnon et al.

(10) Patent No.: US 8,760,575 B2
(45) Date of Patent: Jun. 24, 2014

(54) ADAPTIVE VIDEODESCRIPTION PLAYER

(75) Inventors: Langis Gagnon, Laval (CA); Claude Chapdelaine, Montreal (CA); David Byrns, Sainte-Catherine (CA)

(73) Assignee: Centre de Recherche Informatique de Montreal (Crim), Montreal, Quebec (CA)

( * ) Notice: Subject to any disclaimer, the term of this patent is extended or adjusted under 35 U.S.C. 154(b) by 82 days.

(21) Appl. No.: 13/224,605

(22) Filed: Sep. 2, 2011

(65) Prior Publication Data

US 2012/0054796 A1    Mar. 1, 2012

Related U.S. Application Data

(63) Continuation of application No. PCT/CA2009/000270, filed on Mar. 3, 2009.

(51) Int. Cl.
*H04N 7/00* (2011.01)

(52) U.S. Cl.
USPC ........... 348/468; 725/113; 725/135; 725/142; 715/729; 715/757; 348/62; 348/473

(58) Field of Classification Search
USPC ............. 725/113, 135, 142, 37–61, 116, 136; 715/729, 757; 348/62, 468, 473, 563; 704/271
See application file for complete search history.

(56) References Cited

U.S. PATENT DOCUMENTS

| | | | |
|---|---|---|---|
| 6,496,182 B1 * | 12/2002 | Wong et al. ................... | 345/173 |
| 6,570,585 B1 | 5/2003 | Hines et al. | |
| 6,999,066 B2 * | 2/2006 | Litwiller ....................... | 345/173 |
| 7,143,434 B1 | 11/2006 | Paek et al. | |
| 2001/0001160 A1 * | 5/2001 | Shoff et al. .................... | 725/51 |
| 2002/0021760 A1 | 2/2002 | Harris et al. | |
| 2002/0199204 A1 | 12/2002 | Mory et al. | |
| 2005/0060739 A1 | 3/2005 | Verna | |
| 2005/0182503 A1 | 8/2005 | Lin et al. | |
| 2007/0168864 A1 * | 7/2007 | Yamamoto et al. .......... | 715/716 |
| 2007/0277092 A1 | 11/2007 | Basson et al. | |
| 2008/0243624 A1 * | 10/2008 | Perry et al. ................... | 705/15 |
| 2009/0210797 A1 * | 8/2009 | Cragun et al. ............... | 715/730 |
| 2010/0058430 A1 * | 3/2010 | Jones et al. .................. | 725/151 |
| 2010/0141834 A1 * | 6/2010 | Cuttner ........................ | 348/468 |

FOREIGN PATENT DOCUMENTS

JP    2003058865    2/2003

OTHER PUBLICATIONS

Gagnon et al., "Toward an Application of Content-Based Video Indexing to Computer-Assisted Descriptive Video";RD Department CRIM, Montreal, QC, Canada, H3A 1B9, (2006).*

Benecke, "Meta : Journal des traducteurs / Meta: Translators' Journal", http://id.erudit.org/iderudit/009022ar, Meta/Meta, vol. 49, No. 1, Apr. 2004, 3 pages.

Canadian Network for Inclusive Cultural Exchange, "Online Video Description", http://cnice.idrc.ocad.ca/guidelines/video.php, 5 pages.

(Continued)

*Primary Examiner* — Brian T Pendleton
*Assistant Examiner* — Alan Luong

(57) ABSTRACT

The computer readable storage medium includes computer executable instructions for implementing a videodescription player module. The computer executable instructions implementing a user interface for selecting one or more videodescription output options among a plurality of videodescription output options. A videodescription player module generates a videodescription output that includes vocal communication information according to the selected output option.

27 Claims, 6 Drawing Sheets

(56) References Cited

OTHER PUBLICATIONS

Gagnon et al., "Toward an Application of Content-Based Video Indexing to Computer-Assisted Descriptive Video", Proc. of Computer and Robot Vision 2006, 8 pages.
Gagnon, Automatic detection of visual elements in films and description with a synthetic voice-Application to video desciption, 9th Int. Conf. on Low Vision, Vision 2008, Jul. 7-11, 2008.
PCT/CA2009/000270 Search Report Nov. 30, 2009.
Skills for Access, "How to Provide audio description for video or animated content", http://www.skillsforaccess.org.uk/howto.php?id=104, downloaded on Sep. 6, 2009.
World Wide Web Consortium, "Web Content Accessibility Guidelines 2.0", http://www.w3.org/TR/2007/WD-WCAG20-20071211/, Dec. 11, 2007, 26 pages.
Written Opinion of the International Searching Authority mailed on Nov. 30, 2009 regarding CA29009/000270, 4 pages.
European Search Report for EP 09 84 0962—Centre De Recherche Informatique De Montreal (crim—Aug. 22, 2013.

* cited by examiner

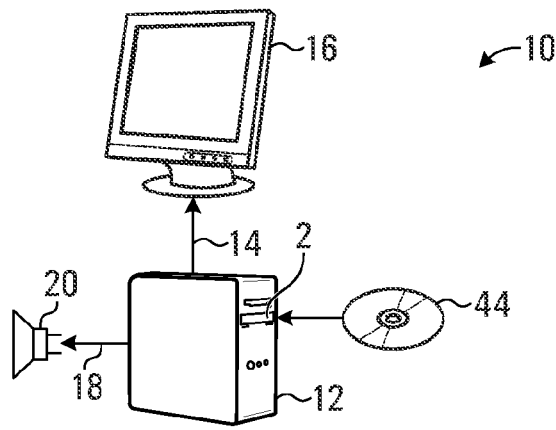
FIG. 1
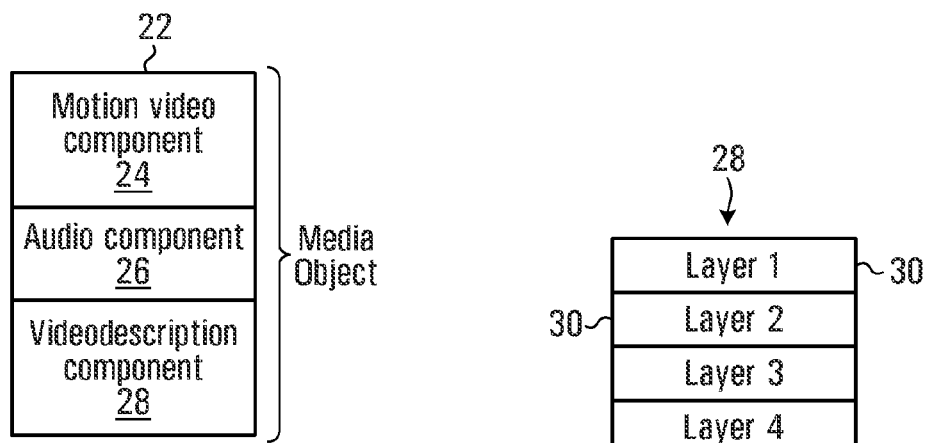
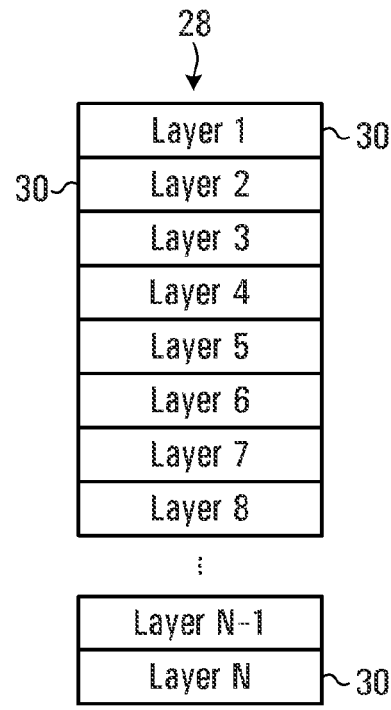
FIG. 2
FIG. 3
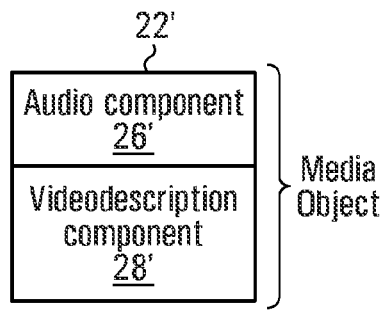
FIG. 2A

ADAPTIVE VIDEODESCRIPTION PLAYER

CROSS REFERENCE TO RELATED APPLICATIONS

This application is a continuation of International Application No. PCT/CA2009/000270 filed Mar. 3, 2009, which is incorporated herein by reference.

FIELD OF THE INVENTION

The invention relates to a videodescription player with selectable videodescription output options. The invention also relates to a media server for sending to the videodescription player videodescription layers.

BACKGROUND OF THE INVENTION

Many people enjoy entertainment programming that is based on visual media, such as films and television (TV) programs. As used here, the term "entertainment programming" refers to any type of live or pre-recorded programming, including both fictional programming (e.g., fictional movies and/or TV shows) and non-fictional programming (e.g., documentary movies and/or TV news programs).

Persons comprising the typical audience of such entertainment programming principally use both their visual and auditory senses to perceive certain information about its content. In particular, certain visual information (or "visual cues") is commonly used in entertainment programming to efficiently communicate information to and/or influence the experience of persons within the audience. For example, a movie character's physique, dress and/or manner of speaking, as well as their current surroundings may provide the audience with contextual information about their location, their possible role in the plot and their likely intentions.

Visual cues are used in the entertainment programming of almost every genre. For example, comedy movies and programs tend to rely heavily on visual cues to allow the audience to appreciate the humor, such as a character getting hit in the face with a pie who then smiles as he eats part of the pie that he was just hit with.

Entertainment programming also typically uses certain auditory information (or "audio cues") in a similar manner to communicate certain information to and/or influence the experience of persons in the audience. For example, horror and suspense films, can increase the sense of suspense or fear of the audience at certain key points through the use of audio cues, such as music and sound effects. A well-known example of such an audio cue is the musical chord in the movie Jaws™ that is played whenever the namesake shark of this movie approaches a character who is in the water.

It is common for persons in the audience of entertainment programming to include both people who can see normally, as well as people with certain visual impairments. Visually impaired people may include people with limited eyesight due to cataracts and/or people who are legally blind due to prior illness or accident. Due to such impairments, visually-impaired people are very likely to not fully perceive (or totally miss) visual cues included within a movie or TV show and rely more (or be solely reliant) on audio cues. This may result in a less-than-satisfactory entertainment experience being provided to those who are visually impaired relative to that experienced by those who are sighted.

For example, a person who is legally blind and a sighted person may both go to a cinema to watch a movie. The inability of the blind person to perceive the visual cues presented may impair their ability to follow and appreciate the film. Even when the sighted person is able to verbally describe visual cues to the blind person, the amount of verbal communication that can be provided about visual cues on the screen may be insufficient to provide the blind person with an equivalent entertainment experience.

Although the above example involved a person who is blind, a similar situation may apply to people with less severe visual impairments, such as those with cataracts or limited peripheral vision. People with these types of visual impairment may miss or not entirely see visual cues that occur within certain area of their vision, which also results in a less-than-satisfactory entertainment experience.

In certain situations, sighted people may also experience less-than satisfactory entertainment experiences from an inability to perceive visual cues. For example, a sighted person watching a TV show may have a baby in another room. The sighted person may have to temporarily leave the room where the TV is located and travel to the room where the baby is located in order to check on or change the baby's diaper. Although it is likely that the audio soundtrack for the TV show would still be audible to the sighted person during this period, it is obvious that he or she would miss seeing visual cues that would have otherwise enhanced their entertainment experience.

Another situation where a sighted person would receive a less-than-satisfactory entertainment experience would occur when the person is involved in a situation where their sense of vision is otherwise occupied. For example, a sighted person who is driving a car may want to catch up on an episode of their favorite TV show but obviously cannot watch it while driving.

"Videodescription" (also known as "audio description" or "descriptive video service") refers to an existing technology that provides an additional narration track intended for visually-impaired consumers of entertainment programming, such as films and TV shows. The narration describes what is on the screen during natural pauses in the audio soundtrack, such as during gaps in the dialog between characters or during transitions between scenes.

However, the current state of the technology providing for videodescription is quite limiting. In particular, the single narration track that is provided for videodescription is typically pre-mixed with the audio soundtrack for the movie or TV show, meaning that a user cannot choose those aspects of the programming for which they would like narration.

Therefore there is a need to improve the current technology in videodescription to enhance the user's entertainment experience.

SUMMARY OF THE INVENTION

As embodied and broadly described herein the invention provides a computer readable storage medium storing computer executable instructions for implementing a videodescription player. The computer executable instructions include a user interface module including a control component for selecting one or more videodescription output options among a plurality of videodescription output options. The computer executable instructions also include a videodescription player module responsive to the selecting for generating a videodescription output that includes vocal communication information for delivery during the rendering of the media object according to the selected output option.

As embodied and broadly described herein the invention also includes a media server for delivering a data stream conveying a media object to be rendered on a display, the media object having a motion video component, an audio component and a videodescription component. The media server has a machine readable storage device for holding a plurality of videodescription layers associated with the media object, each videodescription layer conveys speech describing an entity portrayed in the motion video component. The media server also includes control logic responsive to commands send by a videodescription player, the commands identifying one or more videodescription layers among the plurality of videodescription layers, for extracting the one or more videodescription layers from the plurality of videodescription layers and streaming the extracted one or more videodescription layers to the videodescription player for playing.

BRIEF DESCRIPTION OF THE DRAWINGS

A detailed description of examples of implementation of the present invention is provided hereinbelow with reference to the following drawings, in which:

FIG. 1 is a block diagram of an entertainment system implementing a videodescription player according to a non-limiting example of implementation the invention;

FIG. 2 is a diagram illustrating the various components of a media object rendered by the entertainment system of FIG. 1;

FIG. 2A is a diagram illustrating the various components of an alternate media object rendered by the entertainment system of FIG. 1;

FIG. 3 is a diagram illustrating the elements of a videodescription component of the media object shown in FIGS. 2 and 2A;

Figure 4:
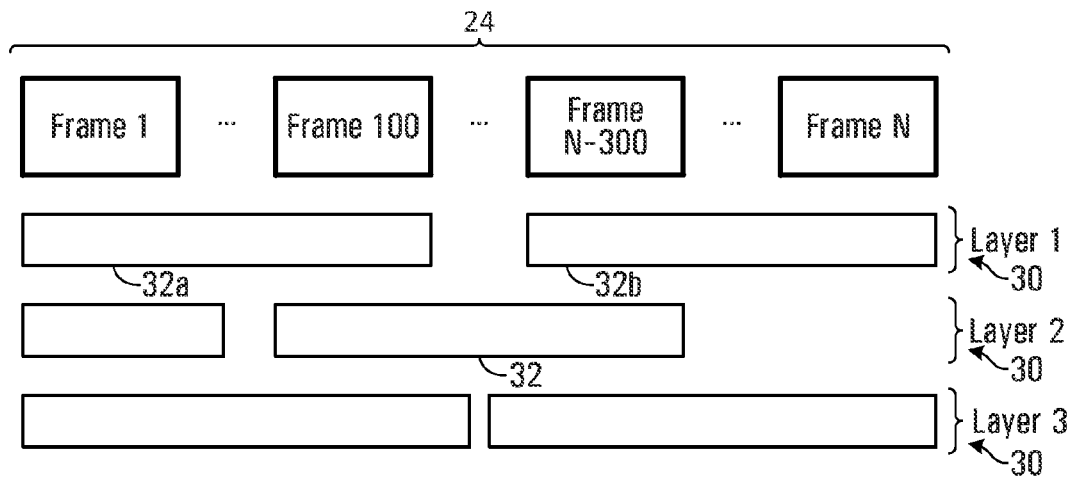
FIG. 4 is a diagram illustrating the relationship between speech segments in a videodescription layer and frames of the media object shown in FIG. 2.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates an entertainment system 10 according to a non-limiting example of implementation of the invention. The entertainment system 10 includes a data processing unit 12 that is intended to output video signals at video output 14 to be displayed at display unit 16. The data processing unit 12 also generates audio output signals at audio output 18 to be played by speakers 20.

The entertainment system 10 renders a media object 22. As shown in FIG. 2, the media object 22 has a motion video component 24, an audio component 26 and a videodescription component 28. In a specific and non-limiting example of implementation, the media object is a movie. In this example, the motion video component 24 includes a series of frames. The frames are still pictures, but create the illusion of movement when the frames are displayed at a certain rate on the display 16.

The audio component 26 includes the sound information associated with the motion video component 24. In the case of a movie, the audio component 26 would convey the soundtrack elements of the movie such as speech, music and any other sounds to be heard when the movie is played.

The videodescription component 28 conveys speech describing one or more entities portrayed in the motion video component. By "entity" is meant any element that can be visually depicted on the display 16. Examples include humans (such as actors), animals or representations thereof in the movie. Another example is inanimate objects such as décor elements (e.g., furniture, transportation devices or general scenery). Yet another example is contextual visual information that is associated with décor, such as the weather. Yet another example is special effects, such as earthquakes, explosions or storms.

In an alternate embodiment, the motion video component 24 may be omitted from the media object 22. FIG. 2A shows a media object 22' that is comprised of only an audio component 26' and a videodescription component 28', which are identical to the components 26 and 28, respectively.

The media object 22' can be rendered by the entertainment system 10 in exactly the same manner as the media object 22, which will be described below. Although this object lacks the motion video component 24, the audio component 26 and the videodescription component 28 can still be rendered. As a result, any speech describing one or more entities in the media object 22' can be rendered to generate audio output signals at audio output 18 that may be played by the speakers 20.

The media object 22' that is illustrated in FIG. 2A may be useful in situations where the sense of vision of a sighted person may be otherwise occupied, such as while they are driving a car. For example, a sighted person driving a car may want to catch up on an episode of their favorite TV show but obviously cannot watch it on a display (such as the display 16) while driving. Although the audio soundtrack for each episode may be available, it is possible that the sighted person would miss certain visual cues that would otherwise have helped them follow the storyline and/or enhanced their overall experience.

The various components of the media object 22 can be stored, transmitted and processed in a wide variety of formats without departing from the spirit of the invention. One specific possibility is to manage these components totally separately. In other words the various components are stored separately, transmitted separately and processed separately. In this case, the only relationship between them would be the synchronization to match the timing between the components such that they all play in a coordinated fashion. The synchronization can be achieved by embedding clock information or any other suitable reference in each component that allows playback of the components in a consistent and coordinated way when they are rendered by the entertainment system 10.

Another possibility is to encode the different components together such that they are transmitted in a common data holder. Non-limiting examples of commonly used data holders that may be used to encode the different components together include the Adobe® Flash® format, the Apple® QuickTime® format and the Microsoft® AVI format, among others.

It should be expressly noted that the format in which the various components of the media object 22 are stored, transmitted or processed is not critical for the success of the invention. Many different formats can be used without departing from the spirit of the invention.

FIG. 3 illustrates the structure of the videodescription component 28. Conceptually, the videodescription component 28 includes a number of constituent elements referred to as "layers" 30. In the example shown the videodescription component 28 has N layers where N can be any integer. While there are no limitations placed on the value N, in practice N would not exceed 10 or 15.

The videodescription layers differ from one another by the speech information they convey. The speech information between at least two layers may be overlapping (at least some of the speech information is common but at least one layer has speech information that is unique to it) or may be mutually exclusive (there is nothing in common between the speech information conveyed by the layers).

For example, layer 1 may convey speech describing the weather in a scene of the movie while layer 2 conveys speech describing the weather in the scene, as well as the décor. In this case the layers convey overlapping speech information, namely that of the weather in the scene. In another example, layer 1 may convey speech describing the décor while layer 2 conveys speech describing the way the characters are dressed. In this case, the layers 1 and 2 are mutually exclusive in terms of speech information conveyed.

The reference to "speech" information in connection to the videodescription layers is not intended to mean that the information is stored or carried as audio data packets, compressed or uncompressed. "Speech" simply indicates that the videodescription layer will be rendered or played by the entertainment system 10 to produce speech.

The information that leads to the "speech" and which is placed in each layer can be stored in many different ways without departing from the spirit of the invention. For example the speech information can be stored and transmitted simply as text. In this case, a text-to-speech synthesizer can be used to generate speech from the text. Alternatively, the speech information can be stored and transmitted in audio form, where the voice is digitally encoded, such as in Pulse Coded Modulation (PCM) format or in any other suitable format. In this case, a text-to-speech synthesizer is not required and the audio data would be played directly.

Specific examples of the type of speech information carried by the videodescription layers 30 are provided below:

1. Narration describing the décor of a certain scene of the movie. For instance, the description may indicate that the action happens in a hotel and then describe the lobby of the hotel, in particular its furniture.
2. Narration describing the lighting effects in a scene of the movie, such as " . . . flashes of light come through the large window of the room as lighting strikes outside . . . "
3. Narration describing the location where the action takes place, such as " . . . Joe the singer is running in a field that was freshly plowed . . . "
4. Narration describes movements of the camera, such as " . . . the camera now sweeps from left to right and then from top to bottom, focusing on a bamboo tree in the garden . . . "
5. Narration describing transitions between shots, such as " . . . the scene now moves from the lobby of the hotel to the street outside . . . "
6. Narration reading or describing text appearing in a scene, such as:
    a. Titles " . . . the great escape . . . "
    b. Relevant text passages on billboards or other signage in movie scenes " . . . the sign on the door reads 'Konrad Roentgen—X-ray specialist . . . "
    c. Credits " . . . Lighting services by Joe Small . . . "
7. Narration describing characters in the movie, such as:
    a. Attitude of characters "Joe has a relaxed attitude while walking on the street . . . "
    b. Spatial relationship of characters " . . . the man and the woman walk very close to one another and hold hands . . . "
    c. Physical attributes of characters " . . . Bill has a beard and a beer belly . . . "
    d. Corporeal expressions of characters " . . . Mary is frantically waving her hand . . . "
    e. Facial expressions of characters " . . . Sandy was smiling . . . "
    f. Movement of characters " . . . the dog was wagging its tail . . . "
    g. Clothing of characters " . . . the young woman is wearing a skirt and jacket . . . "
    h. Occupation or role of characters " . . . Jason is a prison inmate . . . "

The videodescription layers 30 may also be used to adapt speech information (such as information described in the list above) for use by a variety of different audiences and/or audience needs. Such audiences and/or needs may include sentence construction and vocabulary that is adapted for sighted and/or visually-impaired viewers of different ages, as well as for second-language students who may have problems understanding certain sentence constructions, grammatical conventions or slang terms that are commonly understood by native speakers.

In a non-limiting example, assume that a narration describing the scene décor is provided as a videodescription of a scene on a videodescription layer 1. Further assume that a portion of this narration describes a hotel room overlooking the French Rivera using sentence constructions and a vocabulary that would be typically understood by a native speaker of the language, such as: "The huge hotel room features sumptuous furnishings that include a large four-poster bed with silk sheets, a tall mahogany dresser and a set of large bay windows that open onto a balcony overlooking the port below."

Further assume that in addition to the version of the narration that is provided on layer 1, another version of the same narration that is adapted for young children is provided on layer 2. In this case, the sentence construction and vocabulary used for the narration is adapted to those that a child would understand, such as: "The hotel room is very large. In the room, there is a big bed with very soft sheets. There is also a wooden dresser for clothes. Four tall windows go from the floor almost up to the ceiling. These windows can be opened and closed like doors. There is a balcony just outside of the windows. You can see a port from the balcony. Sometimes there are boats in the port."

Those skilled in the art will see that narrations adapted for other potential audiences can be provided in a similar way through the videodescription layers. For example, layer 3 could provide a narration adapted for young adults that includes sentence construction and a vocabulary that is somewhat between the adult and child versions that are respectively provided in layers 1 and 2.

Yet another layer (e.g., layer 4) could provide a narration that is adapted for students of a second-language. Such persons typically possess at least a basic vocabulary and understanding of grammatical conventions and sentence constructions of the second language in which the narration is delivered, however, lack knowledge of certain constructions, exceptions and/or slang terms that are often commonly known and/or used by native language speakers.

For example, compound terms in the narration like "four-poster bed" and "silk sheets" may be replaced with simpler phrases (e.g., "bed with posts" and "sheets made of silk") that might be more understandable to such persons. In other cases, the use of certain advanced verb tenses may be replaced with a simpler tense, such as replacing use of the perfect passive participle of a verb (e.g., "has been") with a simpler past tense of the verb (e.g., "was").

It should be expressly noted that those are only examples and many other different types of speech information can be carried in the videodescription layers without departing from the spirit of the invention.

It is possible that one or more layers included in the videodescription layers 30 may not contain speech information. Instead, the audio content of these layers may provide specific auditory cues that more intuitively communicate visual information in certain instances.

For example, the sound of a page being flipped or a gust of wind could be used as an auditory cue that the scene is changing or has changed. Another sound, such as the sound of a camera lens, could be used as an auditory cue to identify common camera movements, such as when a camera zooms in on a character. These specific auditory cues may identify changes between scenes and/or certain camera movements, allowing a person (and especially a visually impaired person) to more effectively understand and follow developments in a movie or TV show as a result.

FIG. 4 is a diagram illustrating the synchronization between the various videodescription layers 30 and the motion video component 24. The motion video component includes a series of frames which are displayed successively to create the illusion of movement. Each videodescription layer 30 includes a series of speech segments 32. A speech segment is an utterance describing an entity depicted in the motion video component 24. Since it is generally desirable to play the videodescription associated with a certain entity, while that entity appears on the display 16, the speech segment that conveys the narrative about the entity is played at the same time (or about the same time) as the frames showing the entity are rendered. Accordingly, the speech segments 32 are synchronized with the respective frames of the motion video component 24 that depict the subject that the speech segments describe.

In the example shown in FIG. 4, the speech segment 32a of videodescription layer 1 is synchronized with frames 1-100. This means that the speech segment 32a describes an entity shown by the frames 1-100. The next speech segment in that layer, namely speech segment 32b, is in turn synchronized with frames N-300 to N.

Different synchronization mechanisms can be used to synchronize speech segments with frames in the motion video component 24 without departing from the spirit of the invention. For instance, each speech segment 32 can be associated with a synchronization data element that indicates the frame number at which the speech content is to be played. As the motion video is played, playback of the speech segment is triggered when the particular frame number for that segment is reached. During production, the length of the speech segment 32 may be configured in order to end before or at about the time the last frame showing the subject of the narration is rendered.

In the example of videodescription layer 1, the synchronization data element would indicate frame 1 as the trigger for playing the speech segment 32a.

The synchronization data element can be part of the videodescription layer or stored in a data structure associated with the videodescription component 28, which maps the speech segments in each of the videodescription layers 30 to corresponding frames of the motion video component 24. As frames in the motion video component 24 are played, each frame is checked against the database to determine if any of the speech segments 32 should be triggered to play.

Another synchronization mechanism that could be used to synchronize the speech segments 32 with frames of the motion video component 24 is timecode. As used here, "timecode" refers to a sequence of numeric codes that are generated at regular intervals by a timing system, such as a clock.

Typically, frames in the motion video component 24 and the audio soundtrack in the audio component 26 are synchronized to a certain timecode that is based on the rate at which frames in the motion video component are successively displayed, such as 24 frames per second for film. In this case, the speech segments 32 for each videodescription layer 30 would be synchronized to a timecode, rather than to a frame number. For example, each segment in the speech segments 32 would likely have a starting timecode corresponding to a certain frame being displayed at the same timecode.

Regardless of the synchronization mechanism used, synchronization between the content of the audio component 26 and that of the videodescription layers 30 may also need to be taken into account. In particular, the speech segments 32 within these layers could be synchronized in such a manner that they should not interfere with or otherwise obscure certain soundtrack elements of the audio component 26, including:

dialog by a character or between characters in a scene;

key sound effects, such as the sound of a rocket ship blasting off from a launch pad; and/or certain music used within the soundtrack, such as music that sets the tone of a scene, background music used at key points to advance the plot or songs in a musical, among others.

Because a user can select one or more of the videodescription layers 30 to be played, the length of the speech segments 32 may vary depending on the content to be included in the resulting videodescription and the degree to which speech information between certain videodescription layers is common or mutually exclusive. As a result, the task of synchronizing these segments with such soundtrack elements in the audio component 26 can be complicated.

Figure 5:
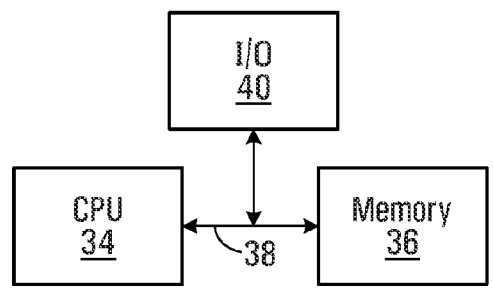
FIG. 5 is a hardware block diagram of the data processing components of the entertainment system of FIG. 1.

FIG. 5 is a high-level hardware block diagram of the entertainment system 10. The system includes a Central Processing Unit (CPU) 34 that executes machine readable instructions stored in a memory 36. The memory 36 communicates with the CPU 34 over a data bus 38. An Input/Output (I/O) interface 40 connects with the data bus 38 as well. The I/O 40 allows the entertainment system to render the motion video component 24, namely by displaying the image on the display 16 and playing the audio (including the narration for the videodescription) at the speakers 20. More specifically, the display 16 and the speakers 20 would be connected to the I/O 40 and the video data and audio data generated as a result of processing the media object 22 would be directed to the display 16 and the speakers 20 via the I/O 40, respectively.

Referring back to FIG. 1, the entertainment system 10 is shown provided with a Digital Video Disk (DVD) player 2 in which a DVD disk 44 can be played. The DVD disk 44 is the source of the media object 22, in other words, the media object data is stored on the DVD disk 44. In this case the DVD player 2 is also connected to the CPU 34 via the I/O 40. During use, the CPU 34 accesses the source data on the DVD disk 44 via the I/O 40 and then outputs the video signal to the display 16 and the audio signal to the speaker 20 via the I/O 40 as well.

Figure 6:
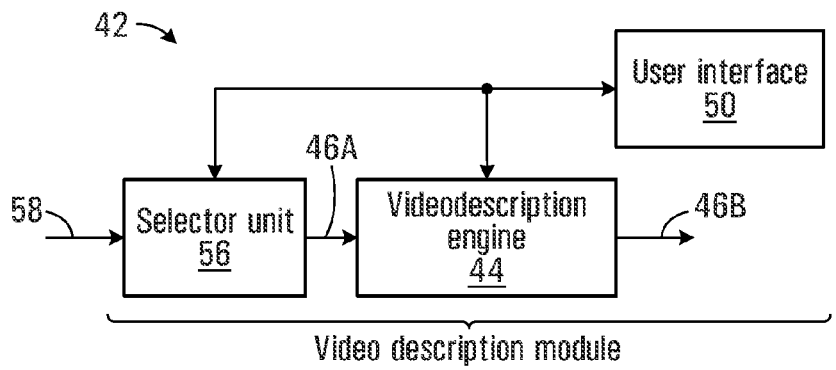
FIG. 6 is a functional block diagram of the videodescription module of the entertainment system of FIG. 1.

Software stored in the memory 36 and executed by the CPU 34 implements the functionality of a videodescription module 42 which manages the videodescription data in the media object 22. A functional block diagram of the videodescription module 42 is shown in FIG. 6. The videodescription module 42 has a videodescription engine 44 that receives speech segments from one or more videodescription layers 30 at an input 46A, processes them and outputs audio data, in PCM format or other, at an output 46B.

The audio data at output 46B can then be combined with the audio component 26. The combined audio data will typically be converted to analog form, amplified and supplied to the speakers 20.

In a specific and non-limiting example of implementation, the videodescription engine 44 uses a text-to-speech synthesizer. The speech segments 32, which are in the form of text information, are supplied at the input 46A. On the basis of this text information, the videodescription engine 44 converts the text data into audio data released at the output 46B. The specific text-to-speech synthesizer used by the videodescription engine 44 is not critical for the success of the invention. Generally such synthesizers are commercially available as off-the shelf items and different ones can be used without departing from the spirit of the invention.

In another example of implementation, when the speech segments 32 convey audio information in compressed or uncompressed format, the videodescription engine 44 does not need the speech-to-text synthesizer functionality. In such case, the videodescription engine 44 is of a simpler construction and may perform decompression of the audio information in the speech segments 32, (assuming the speech samples are compressed), as well as formatting and regulating the audio playing speed (as discussed in more detail below).

In yet another possible example, the videodescription engine 44 can be omitted entirely when the speech samples do not require any processing to generate audio data.

The software implementing the videodescription module 42 includes code that also implements a user interface 50. The user interface 50 allows the user to select one or more videodescription output options from among a plurality of possible videodescription output options. In one specific example of implementation, two general types of options can be set with the user interface 50. The first option category relates to the videodescription layers 30 that are to be played. In other words, the user can determine the videodescription layers 30 that will be played among all the videodescription layers 30 that are available in the media object 22. The user can select one videodescription layer 30 to play or several videodescription layers 30 to play. The second option category relates to the operation of the videodescription module 42 and provides specific options, such as:

1. Adjust the reading speed. In such a case, the user is provided with a control to adjust the speed at which the videodescription information will be read.
2. Select the language of the videodescription. In such a case, the user is provided with at least two language options to choose from. In this example, the videodescription component 28 can be structured to include a plurality of sets of videodescription layers where each set is associated with a given language. When a user picks a particular language, the subsequent videodescription layer selections are made within the set of videodescription layers associated with that language.
3. Select the voice type in which the narration will be delivered (e.g., male, female, American accent, British accent, etc).

Figure 8:
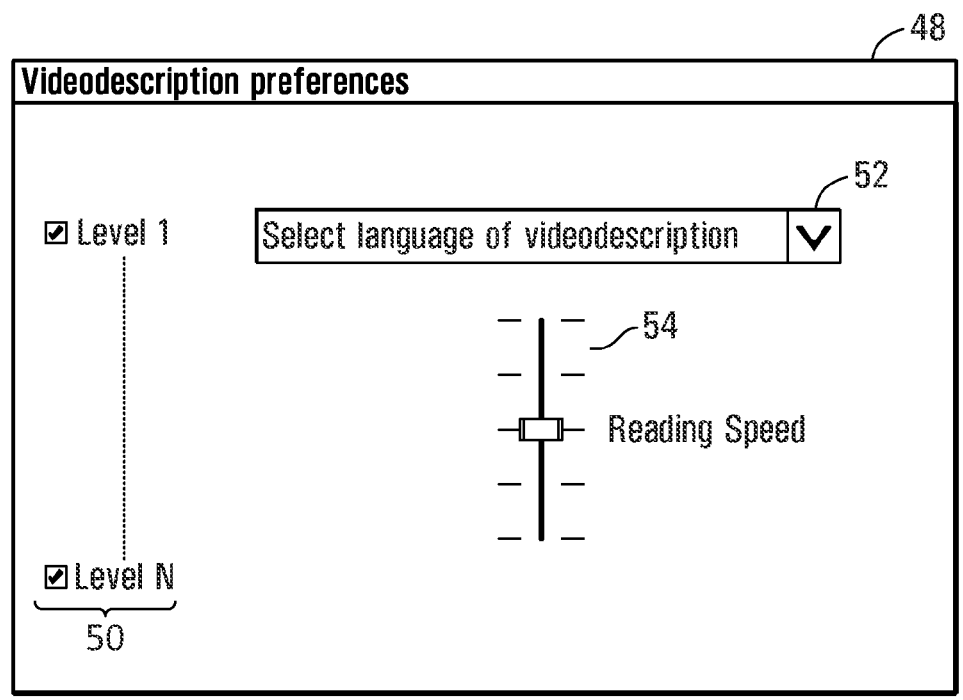
FIG. 8 is an on-screen view of a non-limiting example of a user interface allowing the configuration of certain output options of the videodescription player.

In a specific example of implementation, the user interacts with the user interface 50 via hardware such as a keyboard and a pointing device (not shown) that would be connected to the I/O 40. Information is visually delivered to the user via the display 16. FIG. 8 is an example of an on-screen view of a window displayed on the display 16 and that allows the user to set the videodescription output options. In this example the user interface includes controls that can be operated by the user, for instance by "clicking" on them to set videodescription output options. For instance, the window 48 has a first set of controls 50 in the form of check boxes allowing the user to determine which of the videodescription layers is to be played. In this case, each videodescription layer is associated with a check box. To play a videodescription layer, the user activates a check box by "clicking" on it or conversely deactivates it (to prevent the associated videodescription layer from playing) by also clicking on it. In FIG. 8, videodescription levels 1 and N are shown as being activated. Note that in practice each level, in addition to or in lieu of its number may also be identified by a short description of the speech content it conveys, such as "description of décor" "names of characters", "attitude of characters", etc.

Another control 52, in the form of a drop-down selection menu allows the user to select the language of and voice type for the narration. The user clicks on the control that then shows the list of available languages and voice types and the user makes the selection by using the pointing device.

Yet another control 54, allows the user to set the speed at which the description is narrated. This control is in the form of a slider which the user can adjust via the pointing device in order to increase or decrease the narration speed.

Referring back to FIG. 6, once the user preferences have been set by their interaction with the user interface 50, control data is sent to the videodescription engine 44 and to a selector unit 56 to implement those preferences. The selector unit 56 acts somewhat as a filter by allowing only the videodescription layers 30 selected by the user to be directed to the videodescription engine 44. The selector unit has an input 58 that can access each layer in the videodescription layers 30 of the videodescription component 28. The control data supplied by the user interface 50 determines which ones of the videodescription layers will be passed to the videodescription engine input 46.

Figure 7:
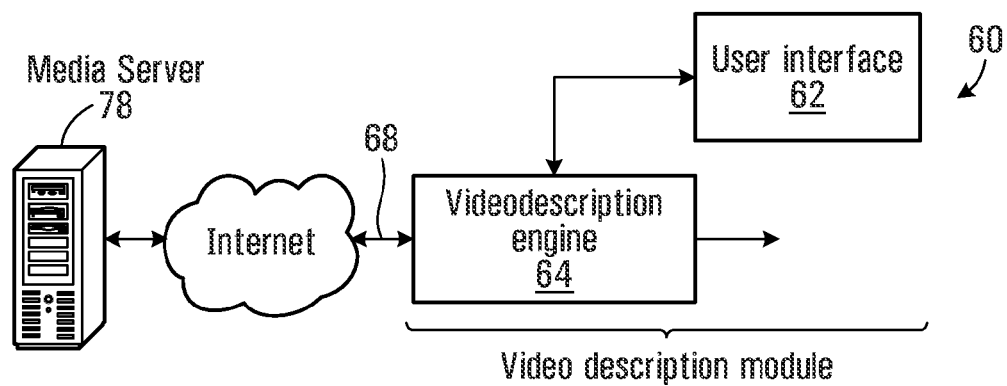
FIG. 7 is a functional block diagram of the videodescription module according to a variant.

FIG. 7 illustrates another example of implementation of the entertainment system. In this instance, the media object 22 is not locally stored, but resides at a remote location instead. The media object 22 is stored in a media server 78, which is at a first location while the videodescription module 60 is at a second location that is remote from the first location. The media server 78 and the videodescription module 60 are connected to one another by a data network allowing the exchange between them of control data and media data. In the example shown, the network is the Internet but other networks can also be used without departing from the spirit of the invention. The data connection can be implemented by using a wired or a wireless type of connection, or some combination of both.

When the user interacts with the user interface 62, which occurs in a similar manner to the previous embodiment, the user interface 62 issues control data to the videodescription engine 64 that in turn generates control data at output 68. This control data is sent via the Internet connection to the media server 78. The control data conveys all or some of the video output options specified by the user during his/her interaction with the user interface 62. In particular, the control data specifies the language in which the narration is to be done and the videodescription layers to be played. In response to the control data, the media server 78 will then stream the media object accordingly, namely including only the videodescription layers specified by the user. This implementation is different from the embodiment described in connection with FIG. 6 where the entirety of the media object 22 resided locally and a filter was used to extract the videodescription layers to be played. In the case of the embodiment of FIG. 7, no selector is needed because the videodescription player 64 only receives the videodescription layers that were previously specified by the user.

The user interface 62 is shown as being connected to the videodescription engine 64. This functional connection allows adapting the operation of the videodescription engine 64 to operational parameters specified by the user, such as the speed at which the speech segments 32 are to be played.

Figure 9:
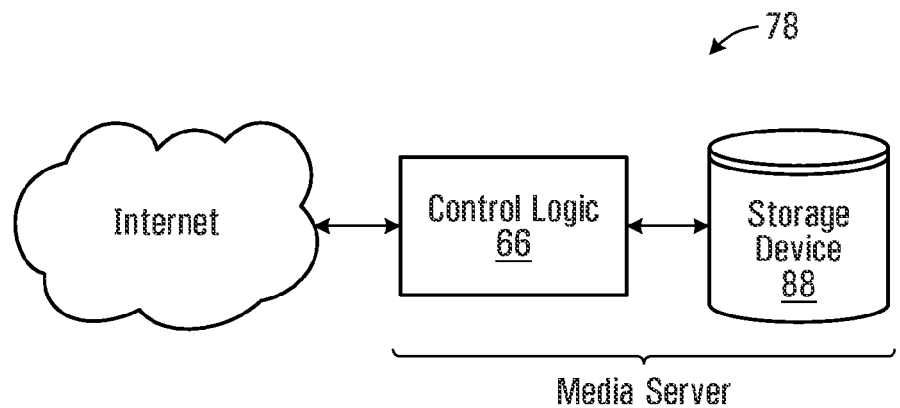
FIG. 9 is a functional block diagram of the media server shown in FIG. 7.

FIG. 9 shows a block diagram of the media server 78. The media server uses a computer-based platform that executes code implementing a control logic 66. The control logic 66 manages the extraction of media data which resides in a mass storage device 88. The control logic 66 is responsive to the control data received via the Internet from the videodescription module 60 in order to stream back to the module 60 the media object 22 with only the selected videodescription layers 30.

In the embodiment described above, the media object 22 that is delivered to the entertainment system originates from a single media server 78. However, it is also possible that the various components of this object may originate from different sources, such as from different media servers.

Figure 10:
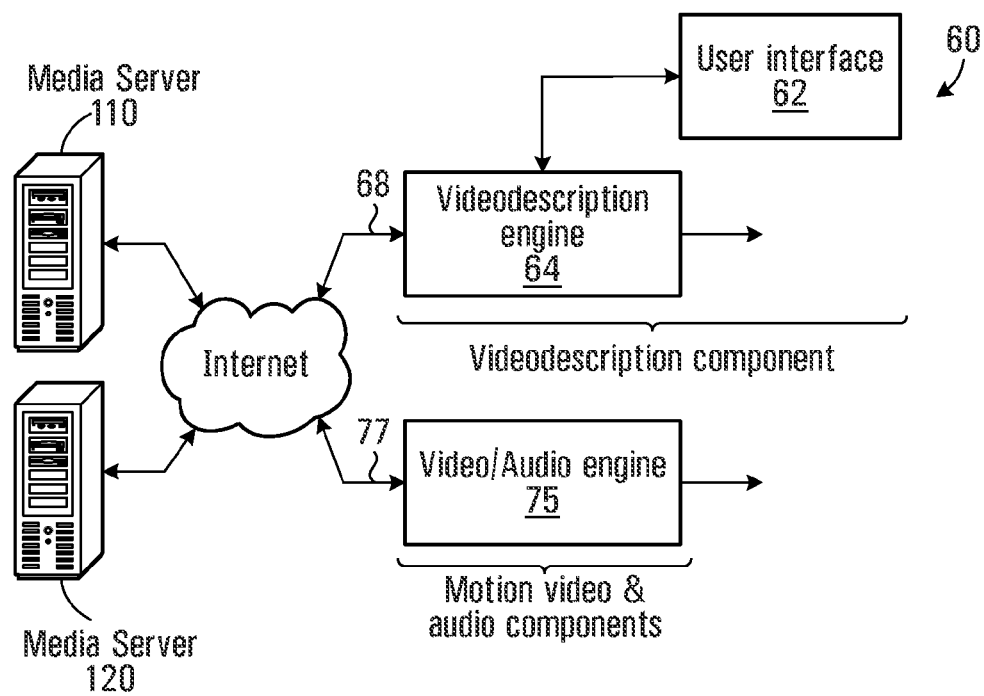
FIG. 10 is a functional block diagram of the videodescription module according to another variant.

FIG. 10 shows yet another implementation of the entertainment system where the videodescription component 28 of the media object 22 originates from a different source than that of the motion video component 24 and/or the audio component 26. In this case, there are two media servers 110 and 120, each of which is specialized to provide only certain components of the media object 22.

The media server 110 provides the motion video component 24 and the audio component 26 of the object 22, while the media server 120 provides the videodescription component 28 of this object. Aside from their specialized roles, each of the media servers 110 and 120 is otherwise identical to the media server 78 and may be based on the same computer-based platform discussed in relation to FIG. 9.

The media servers 110 and 120 may be co-located or remote from one another. In the last instance, the media servers 110 and 120 are operated by totally independent business entities, one providing a video streaming service (streaming the video frames and the sound track), while the other provides only the videodescription service. In such case the user may subscribe to both services simultaneously and pay user fees to each service provider.

When the movie is requested by a user, the videodescription engine 64 may make a request to the media server 120, such as by sending control signals to the media server 120, to start streaming the videodescription. For example, the engine 64 may send certain control data to the media server 120 along output 68 to indicate the movie for which videodescription is needed, as well as possibly the particular videodescription layers that were requested by the user via the user interface 62.

In response to the actions of a user, the media servers 110 and 120 will then stream the media object 22 accordingly, and more specifically, the components of this object for which each server is responsible.

In particular, the media server 110 will stream the motion video component 24 and audio component 26 portion of the media object 22. This stream may be received by a video/audio engine 75 via an output 77, which interprets the data within the stream that contains the motion video component 24 and the audio component 26.

Likewise, the media server 120 will stream the videodescription component 28 of the object, which may include the videodescription layers 30 indicated by the user. This stream may be received by the videodescription engine 64 via the output 68, which interprets the data within the stream that contains the videodescription layers specified in the control data transmitted earlier.

The I/O 40 of the entertainment system may also include a wireless receiver (e.g., radio frequency (RF) or infrared (IR) receiver) that is intended for use with a remote control. The provision of a remote control may allow a user to access and manipulate elements of the user interface by replacing the keyboard and/or pointing device. In addition, a remote control may be used to provide certain functionality during playback of a movie or other entertainment programming, such as being able to control the video playback speed and/or playback direction, among others.

Figure 11:
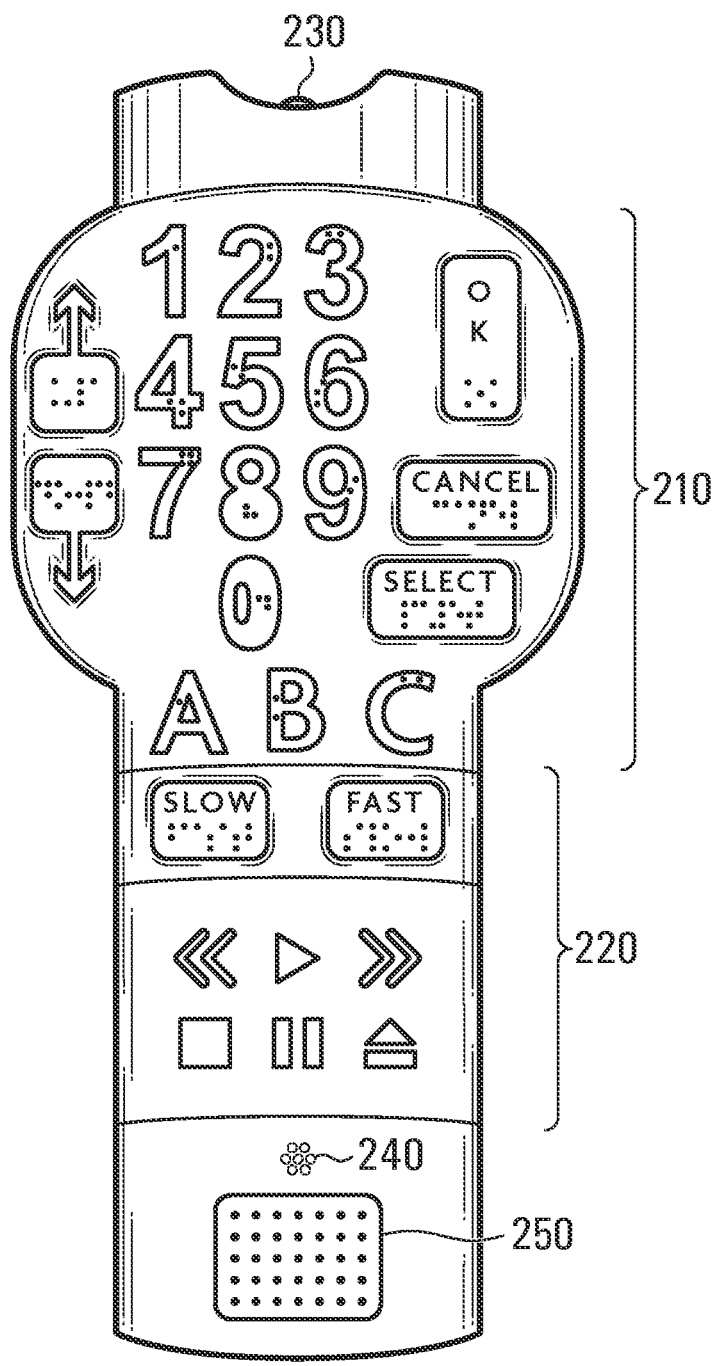
FIG. 11 is a perspective view of a remote control that could be used with the entertainment system of FIG. 1.

FIG. 11 shows one possible implementation of such a remote control 200 that could be used with the entertainment system. The remote control 200 includes a set of selection controls 210, a set of playback controls 220, a transmitter 230, a microphone 240 and an optional speaker 250.

The set of selection controls 210 can be used to navigate within the user interface 62 and configure its controls, such as for the controls 50 used to determine the particular videodescription layers to be included in the narration for the videodescription, the narration language and voice type, as well as for the reading speed. The set of selection controls 210 may include but not be limited to buttons, switches and dials.

The set of playback controls 220 may be used to start, stop, pause and otherwise control the playback of entertainment programming. Such controls may include dedicated buttons intended to start, stop, rewind (i.e., reverse playback), fast-forward (i.e., increase playback speed), pause and eject media (e.g., a DVD disk or other media) from the entertainment system, among others. The set of playback controls 210 may include but not be limited to buttons, switches and dials.

The set of playback controls 220 may also include certain controls that are dedicated for videodescription. For example, the set of playback controls 220 may include controls that adjust the overall playback speed for narrations, such as the FAST and SLOW buttons illustrated in this figure. These controls speed up or slow down the overall speed of the narration by preset increments, such as by ±5% changes in speed. By using these controls, a user can adjust the narration speed using the remote control 200 in a similar fashion to that provided by the controls 54 and 154 during playback of a movie or other entertainment programming.

It should be appreciated that the sets of controls 210 and 220 may be adapted for use by both sighted and visually impaired persons through modifying certain aspects of their size, shape and formatting, among others. For example, buttons in the selection controls 210 may be formed with a larger size and in a shape that represents that of its corresponding alphanumeric character. In addition, such buttons may also have certain projections along their surface that correspond to the Braille equivalent of the alphanumeric character(s). Through these modifications, the selection controls 210 and the playback controls 220 may be effectively utilized through solely tactile means where necessary.

Alternatively, the sets of controls 210 and 220 may consist of one or more "virtual controls" that are displayed on a screen attached to or otherwise integrated within the remote control 200. Furthermore, such a screen could be a "touch screen" whose surface allows a user to navigate and configure controls within the user interface 62 via a certain tactile response upon its surface, such as through a touch, swipe or tap of a user's fingers.

The transmitter 230 is used to send signals from the remote control 200 that indicate the instructions of the user. In particular, the transmitter 230 sends a signal, such as a radio signal or infrared signal to the receiver attached to the I/O 40 when at least one of the controls in the sets of the controls 210 or 220 is activated.

The microphone 240 is used to accept verbal commands from a user in lieu of the use of the controls within the set of selection controls 210 and/or the set of playback controls 220. In particular, when the user issues a verbal command to the microphone 240 corresponding to one of these selection or playback controls (e.g., "play", "stop", "two", "OK", "cancel", etc.) the remote control 200 would transmit the equivalent signal for that control to the entertainment center 10 via the transmitter 230. For example, a user who is currently watching a movie on the entertainment center 10 could simply say the word "pause" to the microphone 240 in order to pause the playback of the movie at that point.

The speaker 250 may be optionally integrated within the remote control 200 to provide auditory feedback and/or confirmation of user actions. In particular, the speaker 250 may audibly identify the control from among the set of controls 210 and/or 220 that was activated by the user. For example, if a user presses the A-button and then the OK button from the set of selection controls 210, the speaker 250 will audibly speak these terms, namely "A" followed by "OK".

In its current form, the narrations provided for videodescription are premixed with the soundtrack of a film or TV program. As a result, videodescription-related text is typically written for and edited in order to fit breaks or gaps that occur naturally in the soundtrack, such as gaps in character dialog and/or breaks between scenes in a movie or TV show. This technique results in shifts between the on-screen dialog of a film or TV program and its videodescription that appear be seamless and natural.

For example, the conclusion of a first conversation between two characters in a movie may be followed by a narration describing the scene décor or a character's appearance until the start of a second conversation, say, 32 seconds later. Currently, the narration for the videodescription will be written and edited purposely to fit within this 32-second gap so as not to disrupt the natural flow of the dialog in the soundtrack.

In the present embodiment, it is likely that the length of the narration provided for the videodescription may change as certain of the videodescription layers 30 are enabled (or disabled) by a user. With respect to the previous example, if the "scene décor", "scene weather", "character attitude" and "character appearance" layers in the videodescription layers are all activated (and assuming there is some relevant content for each layer), the length of the resulting narration may exceed the 32-second gap between the first and second conversations.

In a possible variant, certain controls that adjust the playback speed of the video frames (and/or audio soundtrack) may be provided. Such controls may be embedded within the videodescription layers 30, such that when these layers are processed by the videodescription engine 44, 64 to render the narration, these controls may simultaneously adjust the playback speed for the motion video and audio components 24 and 26 accordingly. As a result, the various components of the media object 22 can be kept synchronized regardless of the length of the narration provided for the videodescription.

For example, assume that the "scene décor", "scene weather", "character attitude" and "character appearance" videodescription layers from the previous non-limiting example are all activated, and that there is relevant information in each layer that must be included in the narration. Further assume that the resulting narration exceeds the 32-second gap between the first and second conversations by 5 seconds. In this case, certain of the selected layers may have controls embedded within them that adjust the playback speed of the video frames and audio soundtrack. When these controls are processed, the playback speed of the motion video and audio may be somewhat slowed (or paused) during this gap in order that the entire 37-second narration can be heard by the audience without otherwise obstructing or cutting off the end of the first conversation and/or the beginning of the second conversation.

Figure 12:
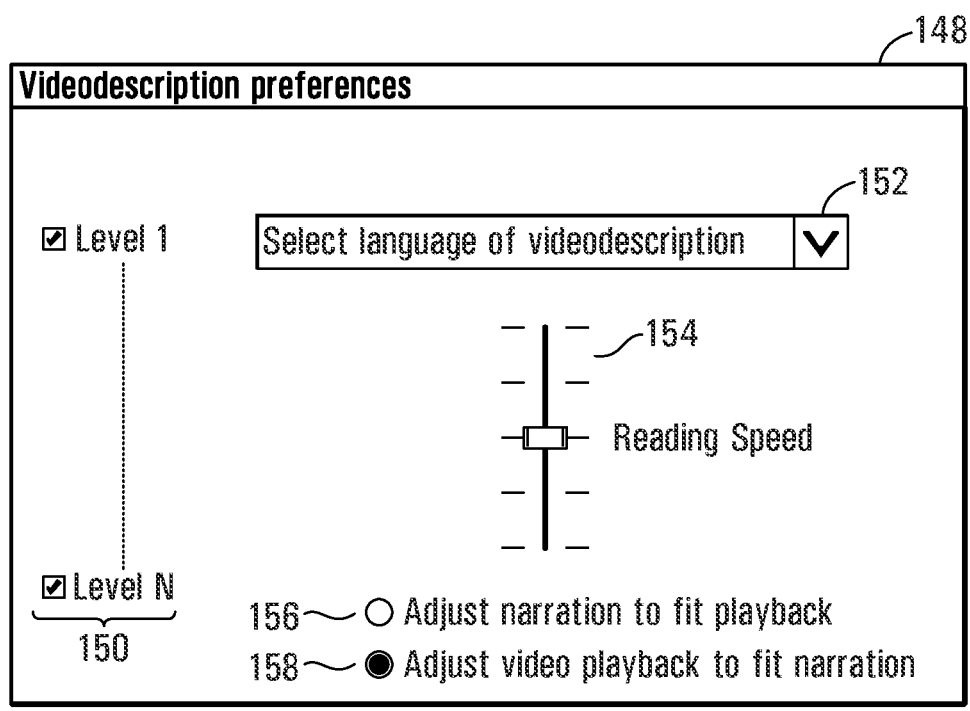
FIG. 12 is an on-screen view of a non-limiting example of a user interface according to a variant of the user interface illustrated in FIG. 8.

Alternatively, the user may also be provided with a certain degree of control over how the entertainment system interprets and acts upon these playback adjustment controls. FIG. 12 shows an example of a user interface that includes a window 148 featuring such controls.

In this window, a first set of controls 150 provided in the form of check boxes allows the user to determine which of the videodescription layers are to be played. In addition, a control 152 to select the language and voice type for the narration, as well as a control 154 to set the reading speed at which the narration for the videodescription is played is provided. The operation of these controls is identical to the operation of the controls 50, 52, and 54 that were respectively presented in conjunction with FIG. 8 previously.

Two additional controls, namely a reading speed adjustment control 156 and a motion video playback control 158, can also be provided in the window 148 to allow the user some degree of influence over the playback of motion video and/or the reading speed for the videodescription. In particular, the control 156 automatically speeds up or slows down the reading speed for the videodescription in order that the narration for the videodescription fits within the naturally occurring gaps or breaks in dialog or within the transitions between scenes.

In contrast, the control 158 may allow the user to configure the default behavior of videodescription engine when it encounters controls in the videodescription layers that adjust the playback speed of the motion video and audio components, 24 and 26.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A non-transitory computer readable storage medium comprising computer executable instructions for implementing a videodescription player for a computing device having a display for use in rendering a media object having a videodescription component, the computer executable instructions including:
   a) a user interface module including a control component having a plurality of videodescription output options, the control component configured to accept one or more selections from a user, wherein the selections include output options corresponding to one or more selected videodescription output layers selected by the user from a plurality of videodescription output layers included in the videodescription component and received by the videodescription player, and wherein the plurality of videodescription output layers includes vocal communication information for delivery during the rendering of the media object;
   b) a videodescription player module constructed and arranged to generate a videodescription output for delivery during the rendering of the media object, the videodescription output including vocal communication information from at least one of the one or more selected videodescription output layers.

2. A non-transitory computer readable storage medium as defined in claim 1, wherein the media object includes a motion video component.

3. A non-transitory computer readable storage medium as defined in claim 2, wherein the media object includes an audio component.

4. A non-transitory computer readable storage medium as defined in claim 3, wherein the media object is a movie.

5. A non-transitory computer readable storage medium as defined in claim 1, wherein the videodescription player module has:
   a) a videodescription input for receiving the plurality of videodescription layers included in the videodescription component;
   b) a videodescription player engine for playing one or more of the videodescription layers received at the videodescription input;
   c) a selector unit constructed and arranged to receive the one or more selected videodescription output options selected by the user, the selector unit configured to retrieve the corresponding one or more selected videodescription layers from the plurality of videodescription layers and direct the one or more selected videodescription layers to the videodescription player engine for playing.

6. A non-transitory computer readable storage medium as defined in claim 2, wherein each videodescription layer of the plurality of videodescription layers conveys speech describing an entity portrayed in the motion video component.

7. A non-transitory computer readable storage medium as defined in claim 2, wherein one videodescription layer of the plurality of videodescription layers conveys speech describing a decor in a scene depicted by in the motion video component.

8. A non-transitory computer readable storage medium as defined in claim 2, wherein one videodescription layer of the plurality of videodescription layers conveys speech describing lighting in a scene depicted by the motion video component.

9. A non-transitory computer readable storage medium as defined in claim 2, wherein one videodescription layer of the plurality of videodescription layers conveys speech describing a location of a scene depicted by the motion video component.

10. A non-transitory computer readable storage medium as defined in claim 2, wherein one videodescription layer of the plurality of videodescription layers conveys speech describing camera motion within a scene depicted by the motion video component.

11. A non-transitory computer readable storage medium as defined in claim 2, wherein one videodescription layer of the plurality of videodescription layers conveys speech describing a transition between shots within a scene depicted by the motion video component.

12. A non-transitory computer readable storage medium as defined in claim 1, wherein one videodescription layer of the plurality of videodescription layers conveys speech describing text appearing in a scene depicted by the motion video component.

13. A non-transitory computer readable storage medium as defined in claim 12, wherein the text is a movie title.

14. A non-transitory computer readable storage medium as defined in claim 12, wherein the text is movie credits.

15. A non-transitory computer readable storage medium as defined in claim 2, wherein one videodescription layer of the plurality of videodescription layers conveys speech describing characters portrayed in the motion video component.

16. A non-transitory computer readable storage medium as defined in claim 2, wherein one videodescription layer of the plurality of videodescription layers conveys speech describing attitude of characters portrayed in the motion video component.

17. A non-transitory computer readable storage medium as defined in claim 15, wherein one videodescription layer of the plurality of videodescription layers conveys speech describing spatial relationships between characters portrayed in the motion video component.

18. A non-transitory computer readable storage medium as defined in claim 15, wherein one videodescription layer of the plurality of videodescription layers conveys speech describing physical attributes of characters portrayed in the motion video component.

19. A non-transitory computer readable storage medium as defined in claim 15, wherein one videodescription layer of the plurality of videodescription layers conveys speech describing corporeal expressions of characters portrayed in the motion video component.

20. A non-transitory computer readable storage medium as defined in claim 15, wherein one videodescription layer of the plurality of videodescription layers conveys speech describing facial expressions of characters portrayed in the motion video component.

21. A non-transitory computer readable storage medium as defined in claim 15, wherein one videodescription layer of the plurality of videodescription layers conveys speech describing clothing of characters portrayed in the motion video component.

22. A non-transitory computer readable storage medium as defined in claim 15, wherein one videodescription layer of the plurality of videodescription layers conveys speech describing movement of characters portrayed in the motion video component.

23. A non-transitory computer readable storage medium as defined in claim 15, wherein one videodescription layer of the plurality of videodescription layers conveys speech describing occupation or roles of characters portrayed in the motion video component.

24. A non-transitory computer readable storage medium as defined in claim 1, wherein one of the videodescription output options among the plurality of videodescription output options is a selection of a speed at which the videodescription player module delivers the vocal communication information.

25. A non-transitory computer readable storage medium as defined in claim 1, wherein one of the videodescription output options among the plurality of videodescription output options is a language in which the videodescription player module delivers the vocal communication information.

26. A non-transitory computer readable storage medium as defined in 1, wherein the videodescription player module further comprises:

a) a videodescription input in communication with a media server, the input configured to receive the plurality of videodescription layers from the media server;

b) a control output in communication with the media server, the control output configured to send control information derived from the one or more selections made by the user, the control information informing the media server which of the plurality of videodescription layers to send to the videodescription input.

27. A non-transitory computer readable storage medium as defined in claim 2, wherein at least one of the videodescription layers conveys control data to vary a speed at which the motion video component is played, the videodescription player module being responsive to the control data to vary the speed at which the motion video component is played in accordance with the control data.

* * * * *